Figure 1:
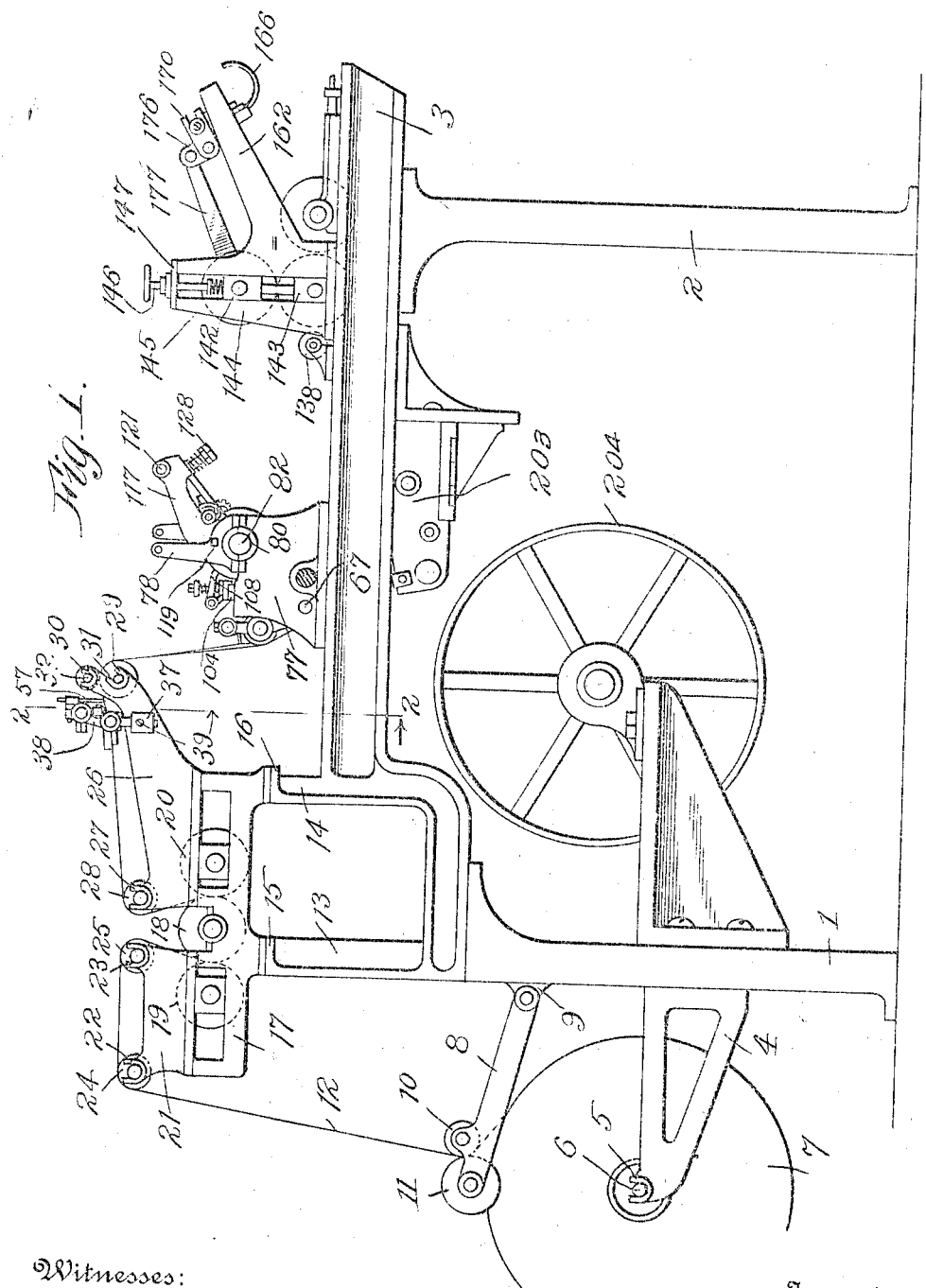

T. W. KIENAST.
ENVELOP MACHINE.
APPLICATION FILED SEPT. 6, 1912.
1,113,019.
Patented Oct. 6, 1914.
12 SHEETS—SHEET 5.
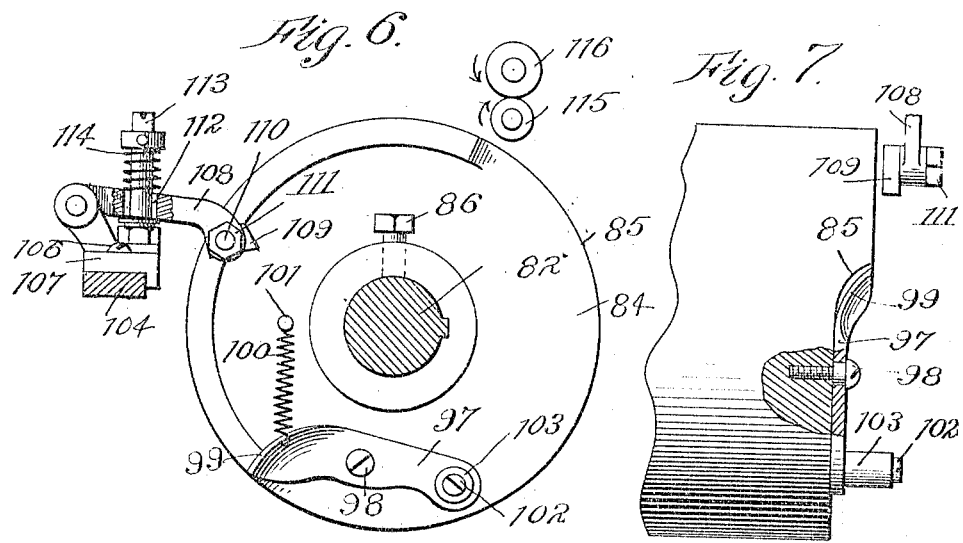
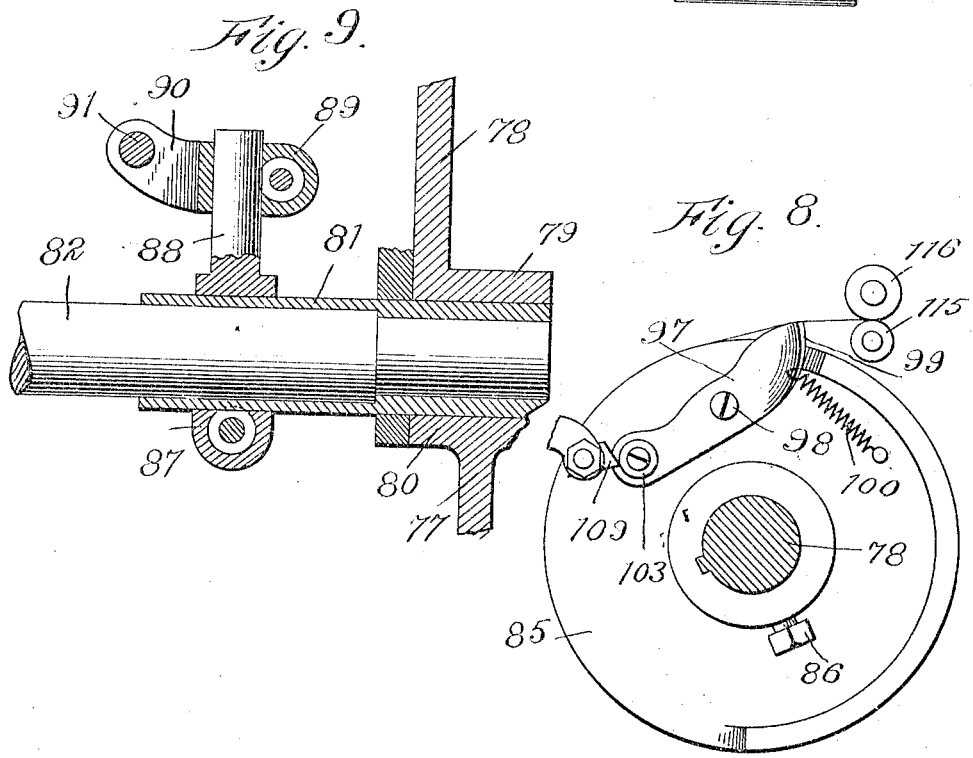
Witnesses:
Clara Hohenstein
Octavius Knight
Inventor
T. William Kienast
By his Attorneys T. W. KIENAST.
ENVELOP MACHINE.
APPLICATION FILED SEPT. 6, 1912.
1,113,019.
Patented Oct. 6, 1914.
12 SHEETS—SHEET 6.
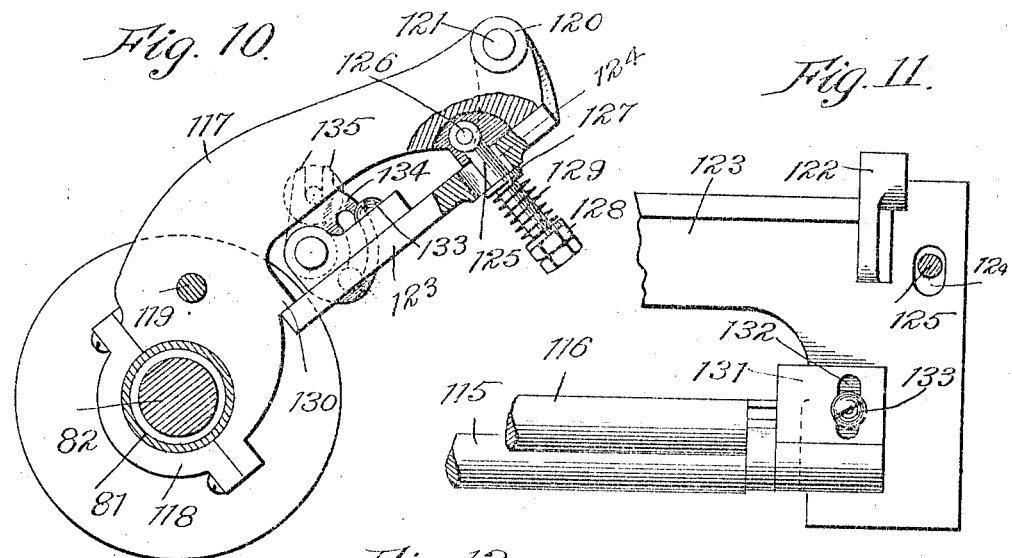
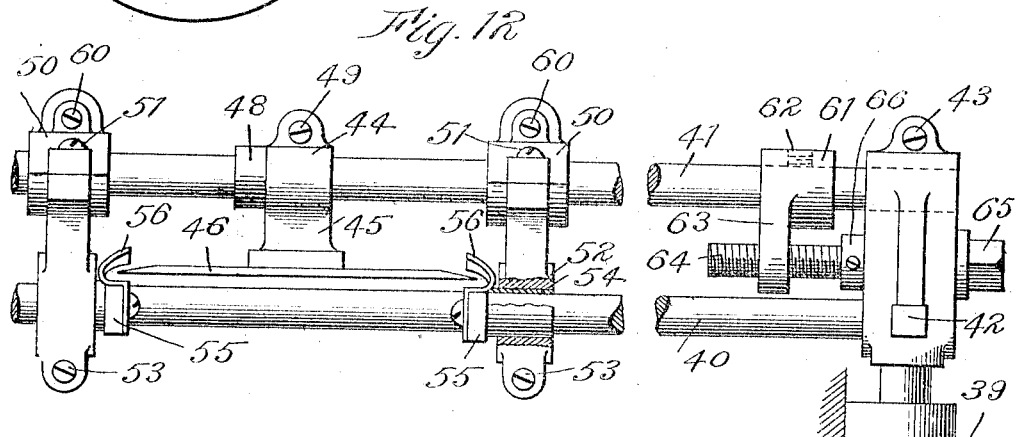
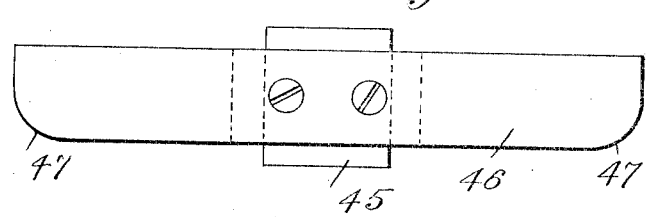
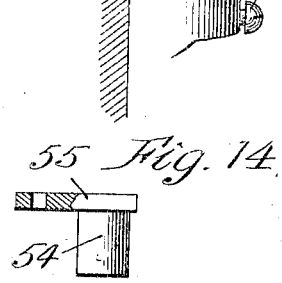
Witnesses:
Clara Hohenstein
Octavius Knight
Inventor
T. William Kienast
By his Attorneys
King & Todd T. W. KIENAST.
ENVELOP MACHINE.
APPLICATION FILED SEPT. 6, 1912.
1,113,019.
Patented Oct. 6, 1914.
12 SHEETS—SHEET 7.
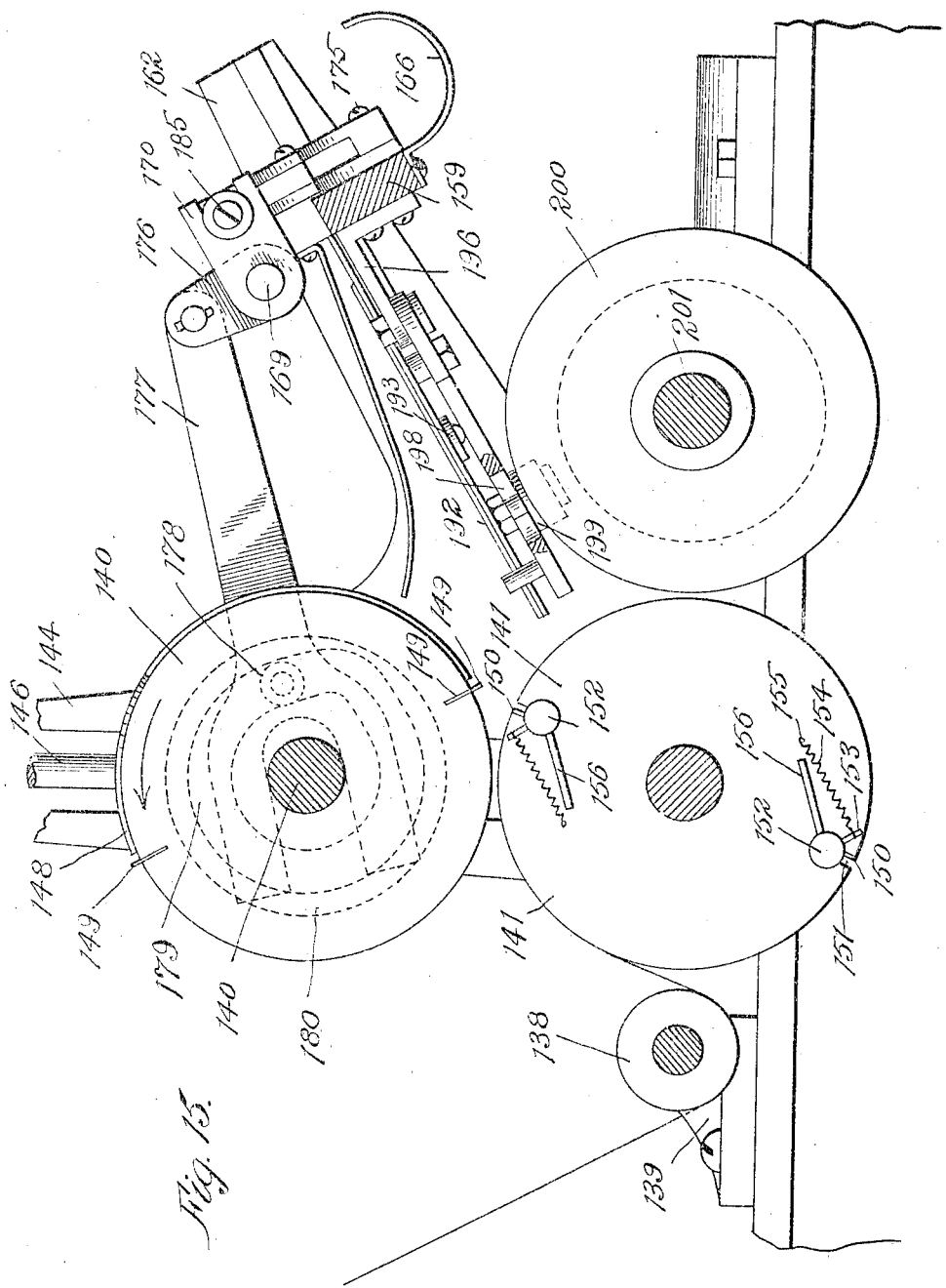

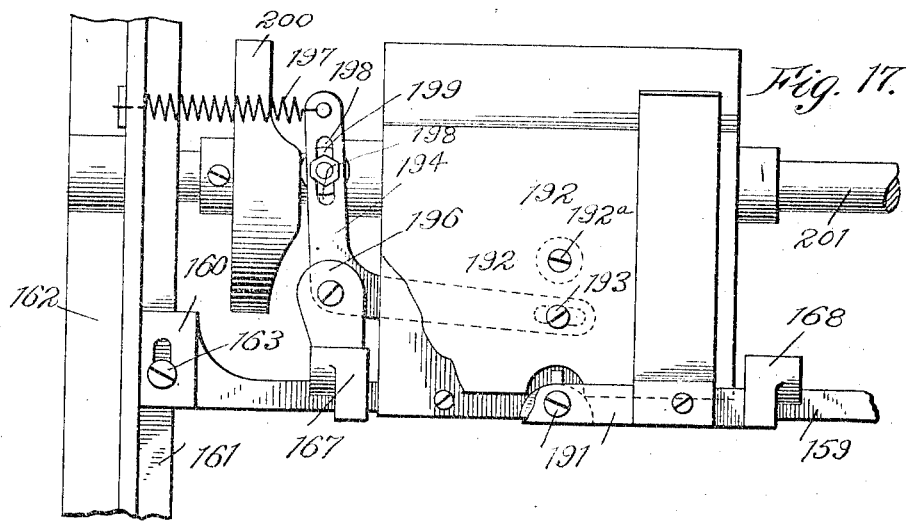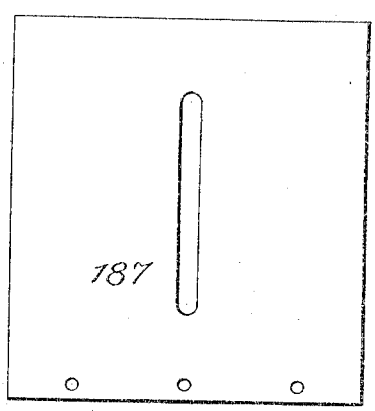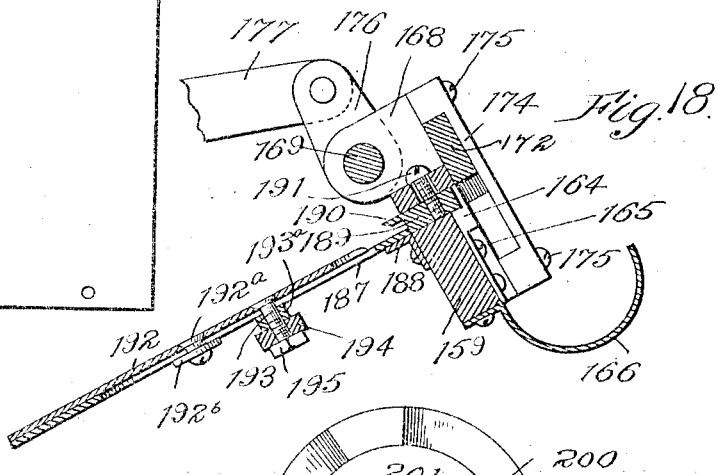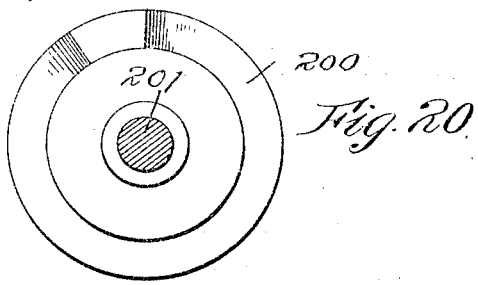

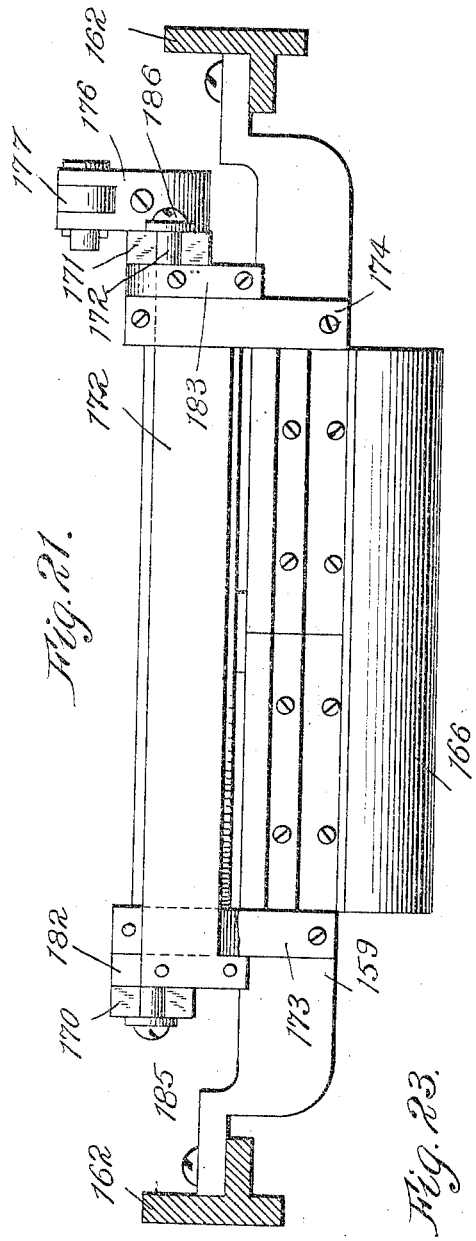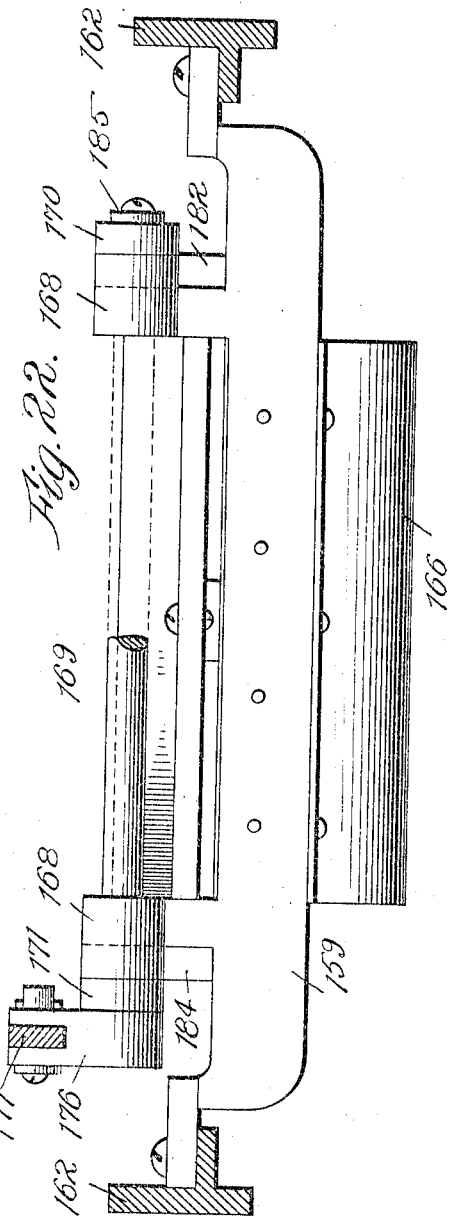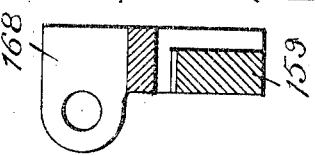

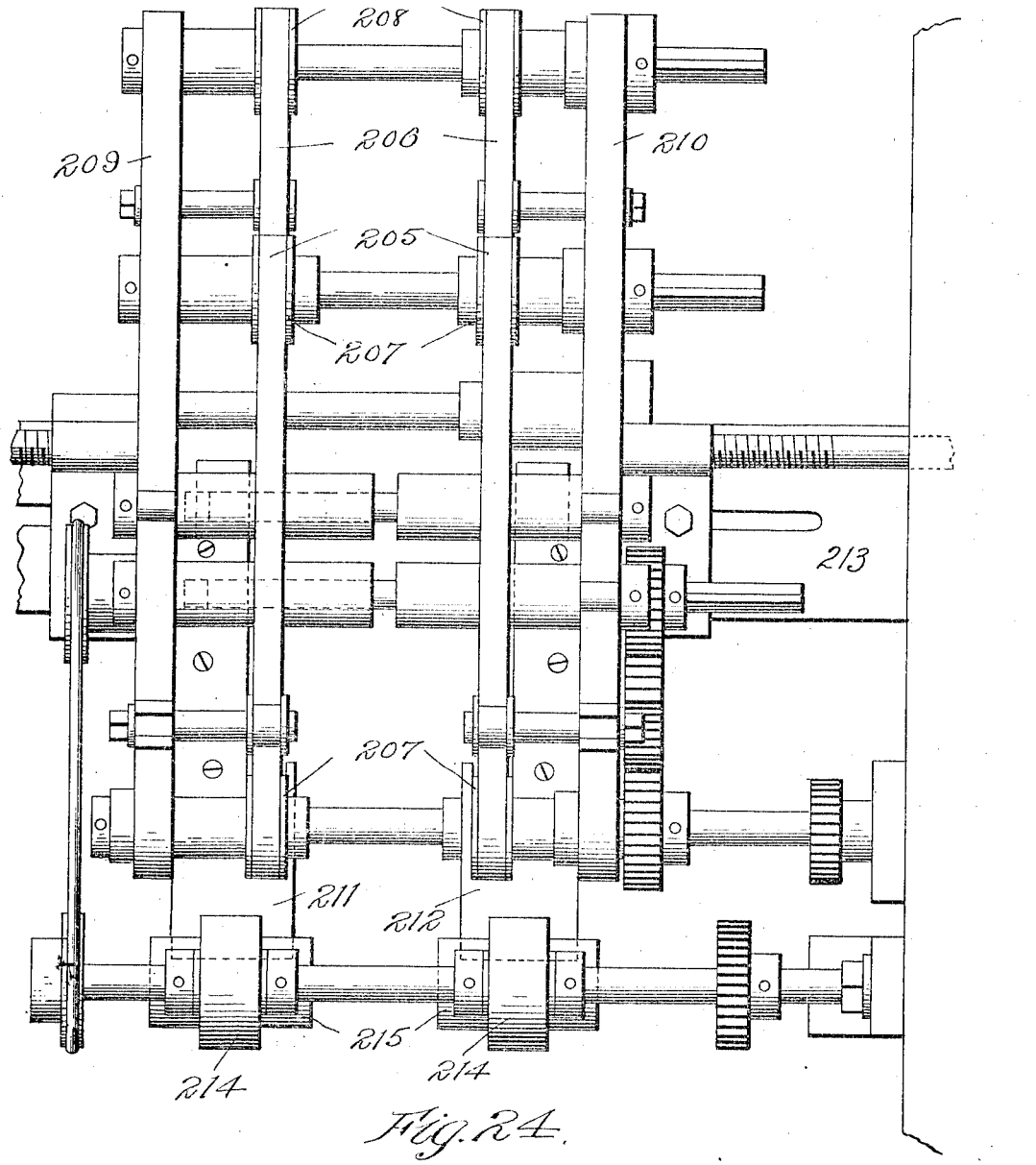

UNITED STATES PATENT OFFICE.

T. WILLIAM KIENAST, OF NEW YORK, N. Y., ASSIGNOR TO SAMUEL CUPPLES ENVELOPE COMPANY, OF NEW YORK, N. Y., A CORPORATION OF MISSOURI.

ENVELOP-MACHINE.

1,113,019.

Specification of Letters Patent.

Patented Oct. 6, 1914.

Application filed September 6, 1912. Serial No. 718,924.

*To all whom it may concern:*

Be it known that I, T. WILLIAM KIENAST, a citizen of the United States, residing in the borough of Manhattan, city, county, and State of New York, have invented certain new and useful Improvements in Envelop-Machines, of which the following is a full and clear specification.

My invention relates to envelop machines and comprises certain improved mechanisms applicable to envelop machines in general, but herein shown as designed more particularly for use in the rotary type of envelop machine such as set forth for example in my prior U. S. Patent No. 933,374, granted September 7th, 1909.

For the purpose of facilitating the formation of side seams by the edge folding device in envelop machines, it has heretofore frequently been the practice to preliminarily score the blank or web on the seam folding lines. The scoring, however, has the serious disadvantage of weakening the paper at the seam.

In order to obtain an accurate folding line and to facilitate the formation of the side seams, my invention comprises as one of its features a preliminary web creasing mechanism by which the edges of the web, before it is cut into blanks, are turned over and pressed down flat to form creases along the folding lines. The effect of this operation is to gain the advantage of the previously employed scoring mechanism, while at the same time avoiding the disadvantageous feature above noted. I prefer to perform this operation before the web is severed into blanks, as in this way the folding line is thus more accurately maintained than would be possible after the blanks are severed.

Inasmuch as the edges of the web are to be subsequently subjected to cutting operation, my invention further comprises a mechanism for opening the fold thus formed, so that the web is restored to its original open condition but still retaining the creased folding line.

Another feature of my invention relates to the cutting mechanism by which chips are removed from the edge of the web. In cutting mechanisms such as shown in my above mentioned United States patent, wherein a cutter cylinder having an irregular cutting edge corresponding in contour with the outline to be cut and pressure rollers which force the edge of the web against the cutting edges of the cylinder are employed, the cut is sometimes imperfect and usually special chip freeing mechanism is provided to break out the forward edge of the imperfectly freed chip and direct it to chip removal rollers or the like. The improvements in this mechanism contemplated by my present invention comprise a novel form of trip finger for tripping the chip freeing devices, and certain adjustments and mountings for the chip removal rollers.

In the blank severing operation as performed in envelop machines of the type referred to, the cut is usually made on a transverse V-shaped line, and the V-shaped end of the blank is usually subjected to an end trimming operation which clips off the corners. The blank severing rolls are provided with transverse creaser blades which form the creases at the top and bottom of the finished envelop, one of the creaser blades serving as the feed device by which the advance end of the blank is moved into the end trimmer and the blank subsequently withdrawn and doubled upon itself along the creased line and delivered to the seam folding mechanism. In this operation the creaser blade grips the blank line at a line near the middle of the blank, so that the advance end of the blank is otherwise free, and where paper of light flexible texture is employed it is sometimes difficult to advance the freed end to the end trimmer. To avoid this difficulty my invention further comprises an improved reciprocating guide plate which is caused to move toward the end trimmer simultaneously with the movement of the paper, but preferably at a somewhat higher speed, whereby the movement of the free end of the blank is assisted.

Other features of my invention will be apparent from a detailed description of an embodiment thereof, which is shown in the accompanying drawing.

In the present application I have claimed only the first feature of my invention referred to above, involving the preliminary creasing mechanism.

Figure 2:
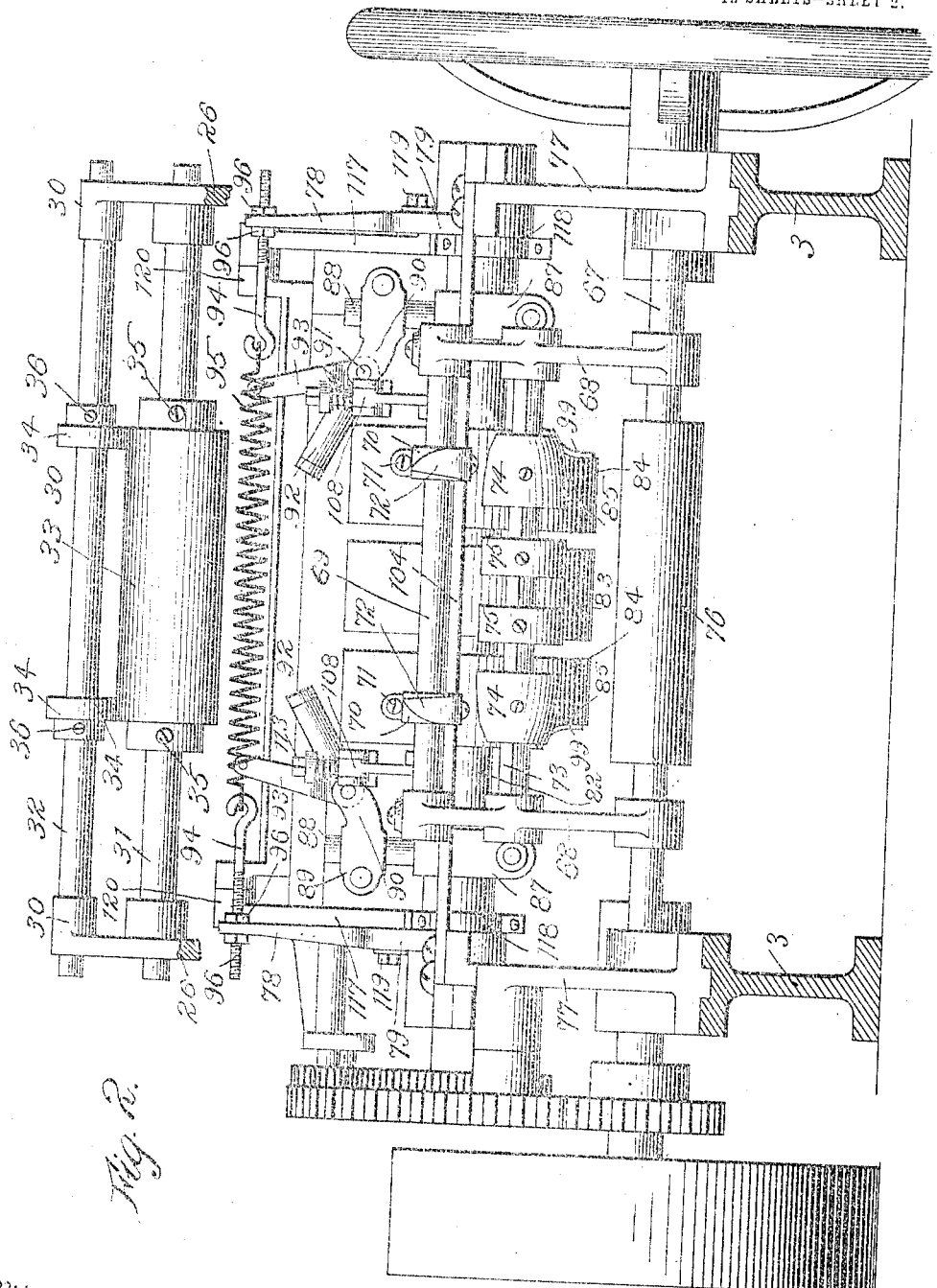
Figure 3:
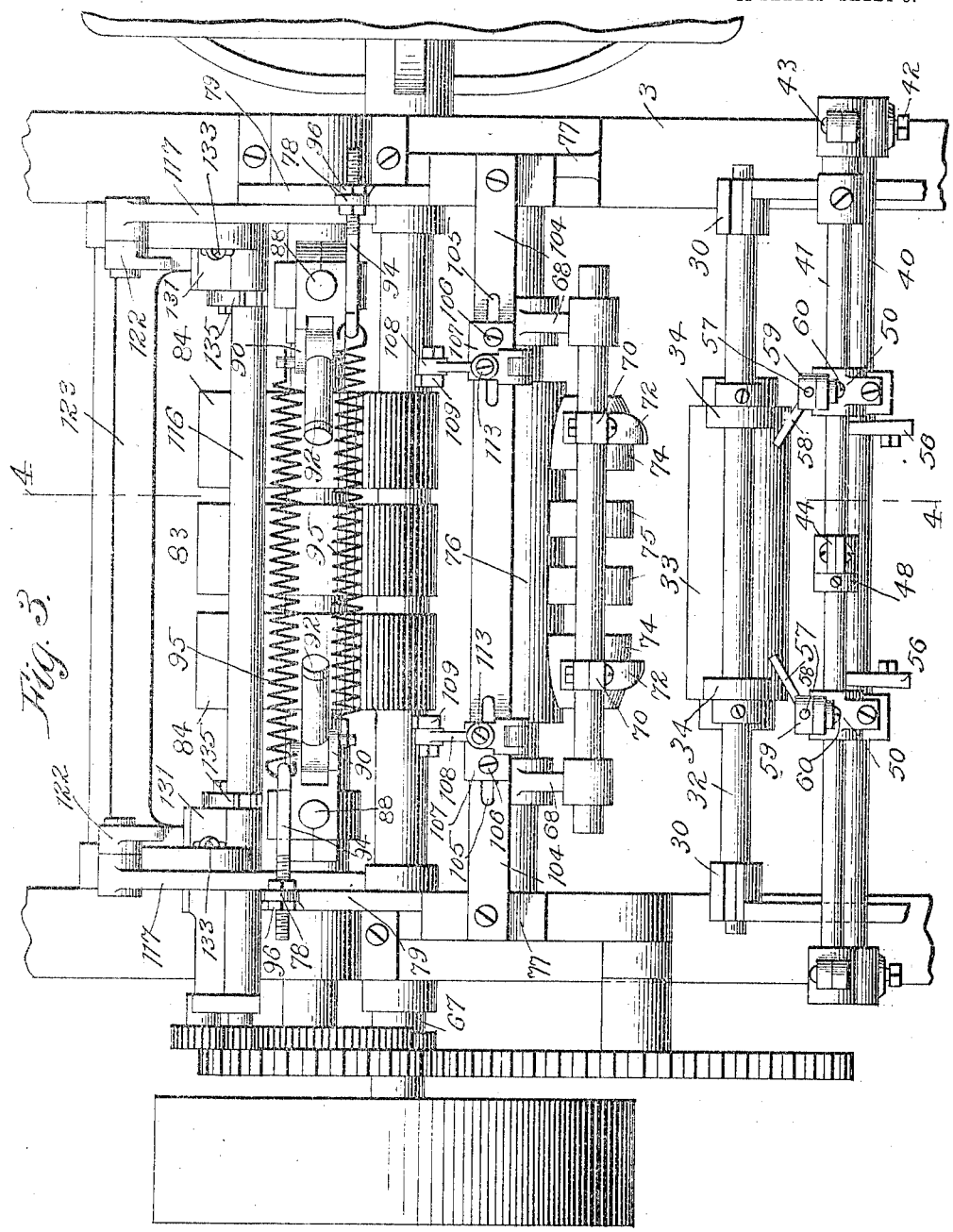
Figure 4:
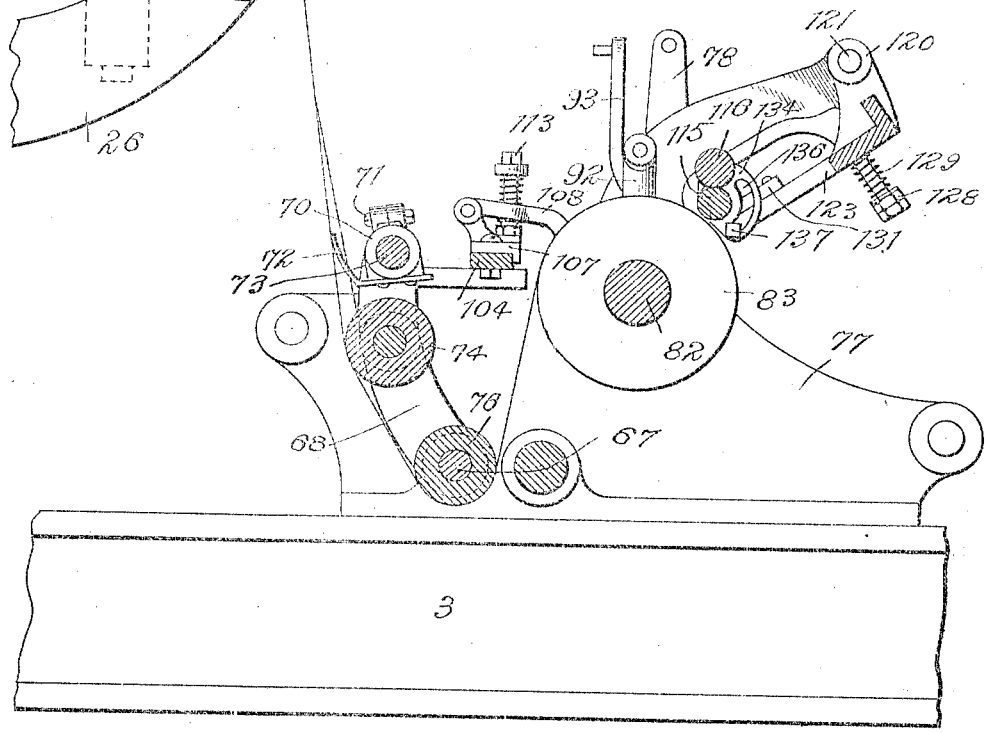
Figure 5:
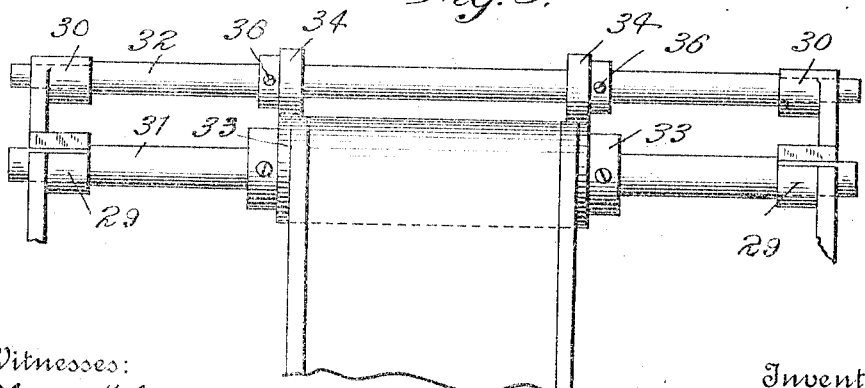
Figure 16:
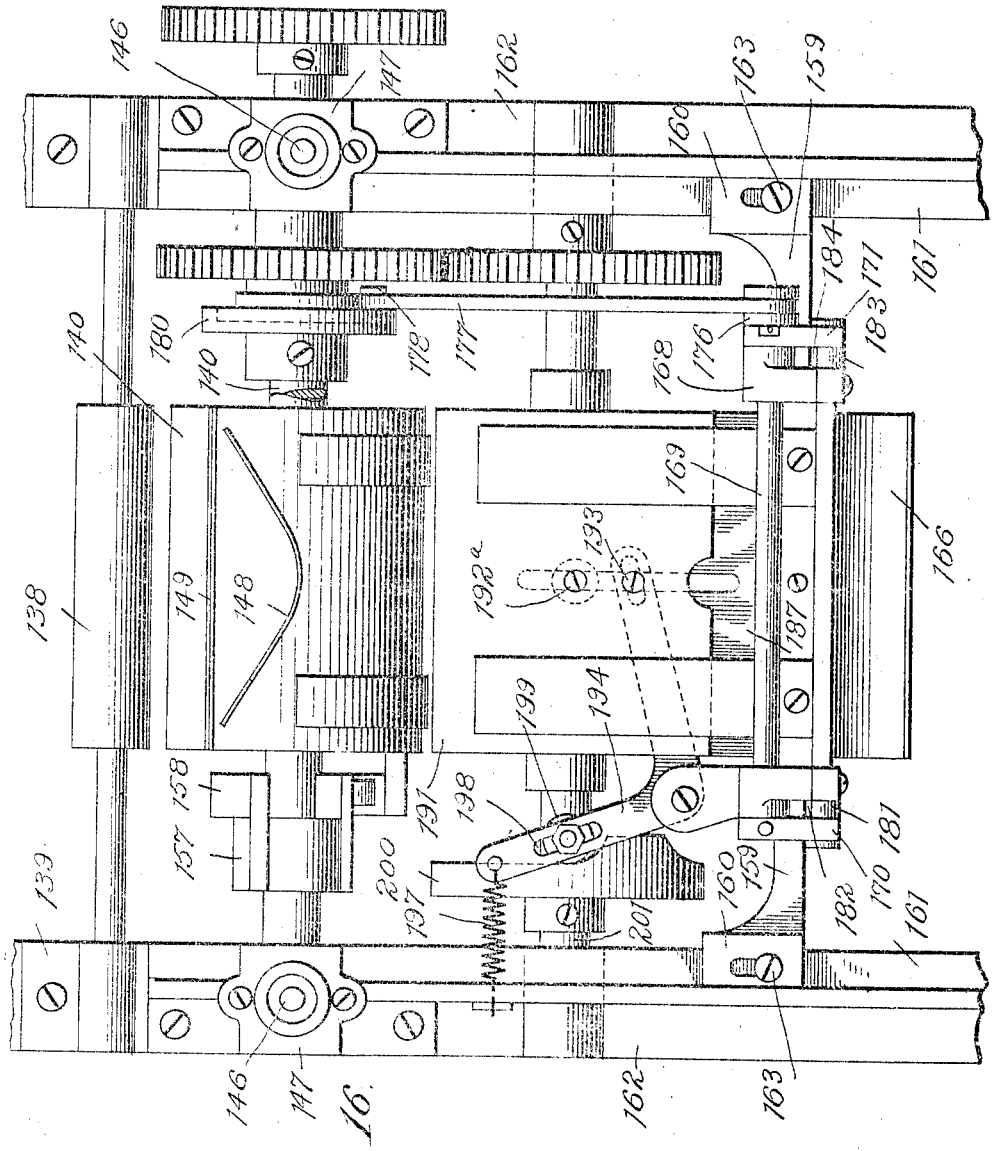

Figure 1 is a side elevation of portions of an envelop machine showing the relation of the several mechanisms contemplated by my invention. Fig. 2 is a transverse sectional elevation on the line 2—2 Fig. 1, showing portions of the preliminary web creasing mechanism, the fold opening mechanism and the cutting mechanism. Fig. 3 is a plan view of the same parts including the mechanism for turning over the edges of the web preliminarily to the creasing operation. Fig. 4 is a longitudinal sectional elevation on the line 4—4, Fig. 3, showing the same parts. Fig. 5 is a detail elevation of the preliminary web creasing rollers as viewed from the rear of the machine. Fig. 6 is a side elevation of the cutter cylinder, showing the relation of the waste or chip freeing and removing members. Fig. 7 is a detail plan of the end of the cutter cylinder, partially in section, showing the mounting of the chip freeing lever and the trip finger which engages and guides the same. Fig. 8 is an end elevation of the same with the chip removal rollers showing the chip freeing device in the act of directing the chip to the removal rollers. Fig. 9 is a central vertical section through the adjustable support for the pressure rollers which coöperate with the cutter cylinder in cutting out the chip. Fig. 10 is a detail view in side elevation showing the mounting of the chip removal rollers. Fig. 11 is a detail plan view of one side of the adjustable and resilient support for the chip removal rollers. Fig. 12 is a detail elevation showing the preliminary web folding mechanism and its adjustable mounting, viewed from the front of the machine. Fig. 13 is an underneath plan view of the preliminary folder bar. Fig. 14 is a detail view of the sleeve member for holding the preliminary web folding blades. Fig. 15 is a side elevation, the side frame of the machine being removed, showing the blank severing and transverse creasing rolls and the end trimmer with its reciprocating guide plate. Fig. 16 is a top plan view of the same viewed from the rear of the machine. Fig. 17 is a similar view of the reciprocating guide plate in advanced position. Fig. 18 is a vertical longitudinal section through the end trimmer and guide plate. Fig. 19 is a detail plan view of the slotted top plate upon which the guide plate reciprocates. Fig. 20 is a side elevation of the cam which operates the reciprocating guide plate. Fig. 21 is a rear elevation of the end trimmer in elevated position. Fig. 22 is a front elevation of the same, and Fig. 23 is a central cross section of the knife support thereof. Fig. 24 is a top plan view, and Fig. 25 an underneath plan view of a folding mechanism, which may be employed in the machine.

Referring now more specifically to said drawings, it will be seen that the main frame of the machine, as shown in Fig. 1, comprises uprights 1 and 2 at the front and rear of the machine, respectively, and two side frames 3 which rest upon the uprights 1 and 2. Suitably secured upon the front of the uprights 1 are the supporting brackets 4, which comprise open journal bearings 5 for the reception of the shaft 6 of the roll of paper 7. A pair of arms 8 are pivoted in brackets 9 also on the front of the uprights 1, and have journaled in them idle rollers 10 and 11, the latter being flanged to provide a lateral guide for the paper roll 7 and the former being of any suitable construction, for serving as a guide for the web 12, drawn from the paper roll 7. The guide device thus comprised, rests by gravity upon the upper portion of the paper roll 7.

The side frames 3 are preferably cast, with vertical supports 13 and 14 at the forward portions, and with top flanges 15 and 16 upon which are mounted side frames 17 of the printing mechanism. The particular construction of the printing mechanism does not constitute part of my present invention but is shown diagrammatically as comprising a central impression cylinder 18 and two form rolls 19 and 20, suitably mounted upon the forward portions of frame 17. Side frames 21, having open journal bearings 22 and 23, are mounted upon the printer frames 17 and bear the guide rolls 24 and 25, respectively, the former of which receives the web from the above mentioned guide roll 10 and the latter of which directs it to the central impression cylinder 18 of the printer. The web passes under the impression cylinder 18, where it receives the impression from the form rolls 19 and 20 when the printing operation is desired to be effected.

After the web has been subjected to the printing operation it is passed through the preliminary web creasing device which forms the preliminary crease along each side of the web for facilitating the subsequent seam forming operation. Upon the rear portions of the printer frames 17 are mounted side frames 26 of the preliminary web creaser mechanism. The forward portions of the side frames 26 are provided with open journaled bearings 27 for the reception of a guide roller 28 which receives the web from the central impression cylinder 18. The rear portions of the side frames 26 are provided with open journaled bearings 29 and 30 which bear the shouldered shafts 31 and 32 upon which are adjustably positioned the web creasing roller 33 and the web creasing disks or rollers 34 secured by set screws 35 and 36. The creasing roller 33 is centrally positioned upon its shaft 31 whereas creasing disks or rollers 34 are adjusted toward and away from the medial line of the machine to correspond with the width of the web upon which the creasing operation is effected.

Disposed between the guide roller 28 above referred to and the web creasing rollers 33 and 34 is the mechanism for turning over the edges of the web preparatory to the formation of the creases by the creasing rollers. To support these edge turning devices sockets 37 are formed on the sides of the side frames 26, and in these the frames 38 are mounted and secured in place by set screws 39. These frames (see Figs. 1, 3, 4 and 12) have mounted in them cross rods or bars 40 and 41. Rod 40 is held in adjusted position by set screws or bolts 42, while rod 41 is clamped by the tightening screws 43 which draw together the split upper ends of the frames. The rod 41 has secured to it a split ring 44 which has a lower projection 45 bearing the folder bar 46 shown in detail in Figs. 12 and 13, its rear edge being rounded off at the ends 47. A positioning ring 48 may be secured to the rod 41 to mark the central position, so that when a folder bar 46 of different size is to be substituted to adapt the device to different sizes of envelops, the relative position of the folder bar and the edge turning devices to be described may be maintained. In removing the folder bar 46 the tightening screw 49 which draws together the upper ends of the split ring 44 is loosened so that the split ring is freed from the rod. Mounted upon the rod 41 at either side of the folder bar mounting is a split ring 50 which is secured by tightening screw 51. A lower extension 52 from the split ring 50 is in the form of a second split ring around the rod 40 which is tightened by means of tightening screw 53, upon a sleeve member 54 which fits loosely around the rod 40 within the split ring 52. Sleeve 54 has projecting forwardly from it a flange or plate 55 to which is screwed or otherwise secured the edge turning plates 56, which operate upon the principle well known in folding operations of this kind. The edge turning plates 56 are thus supported adjacent to the ends of the folder bar 46, so that as the web of paper passes between them the edge of the web is turned upward and inward over the folder bar 46. In order to maintain the edge of the paper web in this folded condition until it reaches the creaser rolls 33 and 34 I provide the holding fingers 57, which are in the form of bent wires or rods having turned in lower ends 58 under which the edges of the web pass on the way to the creaser rolls. These retaining fingers are mounted in sockets 59 which are secured to the split rings 50 of the edge turning device by screws or the like 60 (see Figs. 3, 4 and 12).

In order to center the edge turning mechanism as a unit I provide a sleeve or collar 61 which is secured to the rod 41 by screw 62 or the like and which has a lug 63 perforated and threaded to receive the threaded shaft or bolt 64 which has a bearing in one of the frames 38 and is held against lengthwise movement therein by its operating head 65, and the retaining collar 66 as clearly shown in Fig. 12 of the drawing. With the construction described it is thus apparent that by turning the adjusting bolt 64 the rod 41 may be moved to the left or to the right, carrying with it as a unit the folder bar 46, the edge turning plates 56 and retaining fingers 57.

After the edges of the web have been turned over and pressed down to form the side crease the web passes to the fold opening device as illustrated in Figs. 1, 2, 3 and 4. This device is adjustably mounted upon a stay shaft 67, which is suitably fixed in side frames of the cutting mechanism to be hereinafter described. Fixed upon the stay shaft 67 are upright bracket arms 68 in the upper ends of which is secured the cross-rod 69 upon which are mounted split rings 70 adjustably secured by tightening screws 71 and supporting the fold opening plates 72 in a suitable position to turn the folded edges of the web slightly outward from the main body.

Mounted in the upright bracket arms 68 immediately below the cross rod 69 is a rod or bar 73 upon which are adjustably secured the web spreading devices 74 and supporting rollers 75. The spreading devices 74 are in the form of truncated cones, or approximately so, and their function is to receive the web as it leaves the fold opening plates 72 and maintain the edges of the web out from the body of the paper in a more or less flattened condition. The guide roll 76 is suitably mounted upon the stay shaft 67 below the spreading devices 74 and receives the web from them at the completion of the fold opening and spreading operation. The paper which is thus restored to its original open condition, but which retains permanently the crease near each edge, is then led to the edge cutting mechanism, which will now be described.

The side frames in which the cutting mechanism is mounted are shown at 77 and are mounted upon the main side frames 3 of the machine. Mounted upon the side frames 77 are the upright arms 78 which are formed at their lower portion with semi-annular flanges 79 coöperating with semi-annular flanges 80 on the side frames 77 to receive the bearing sleeves 81 shown in Fig. 9. The bearing sleeves 81, as shown in Fig. 9, have interior shoulders and have journaled in them the shouldered shaft 82 of the cutter cylinder. The cutter cylinder comprises in general the inner web supporting section 83 and the outer cutter sections 84. The cutter sections 84 are provided with cutting edges 85 which operate to cut away sections of the web along the edge as will hereinafter appear. Sections 83 and 84 are adjustably positioned and secured upon the shaft 82 by set screws or bolts such as 86, shown in Fig. 6, to adjust the cutting mechanism to different widths. Adjustably secured upon bearing sleeves 81 by their split ring portions 87 are the supporting studs 88 which are set preferably in approximately vertical position. Upon the studs 88 are adjustably secured by means of their split ring portions 89 the yokes 90, in which are pivoted by their trunnions 91, the pressure roller members 92. Integral with or suitably secured to them are the spring attachment arms 93 projecting upwardly from the trunnions 91. The upright arms 78 above referred to are perforated at their upper ends and serve as brackets or supports for spring securing hooks 94, their inner ends being hook shaped or looped to engage and hold the outer end of a retractile spring 95, the opposite end of which is secured to the spring attachment arm 93 of the pressure roller at the opposite side of the machine. The outer end of each spring securing hook 94 is threaded and passes through the perforation in the upper end of the upright arm 78, being adjustably held therein by binding nuts 96, so that the tension on the retractile spring 95 may be suitably regulated. The effect of each retractile spring 95 is thus to maintain its corresponding pressure roller 92 against the outer edge of the cutter cylinder section 84 during the rotation of the latter. It is apparent that the mounting of the pressure rollers 92 upon their supporting studs 88 provides for adjustment both vertically and horizontally, so that the pressure rollers may be set at the most effective angle to the surface of the cutter cylinder sections.

The effect of the pressure rollers in the operation of the machine is to press the edges of the web against the cutting edges of the cutter sections so that chips are more or less perfectly cut out from the web. The cutting portion of the cutter cylinder is narrower than the remainder so that the web before it is severed into lengths as will be described later, is formed into a succession of wide and narrow portions the wider serving as the front of the completed envelop and the narrower serving as the back and sealing flap thereof, the edges of the wider portion which project beyond the line of the narrower portion serving as the envelop seams which are subsequently, in the progress of the manufacture, to be gummed and turned over upon the back of the folded blank or envelop unit.

The cutting operation referred to usually requires a chip freeing device which serves to break out the chip should it be imperfectly severed by the cutting mechanism. I therefore provide each of the cutter sections 84 with a rocking lever 97 which is pivoted to a shouldered screw 98 threaded into the end of the cutter section. This chip freeing rocking lever 97 has its operating end 99 held normally flush with or slightly below the surface of the cutter section at the advance end of the cutting edge 85 by means of a return spring 100 attached to a pin 101 carried by the cutter section 84. The other end of the rocking lever 97 is provided with a post 102 upon which is journaled an anti-friction roller 103 projecting away from the end of the cutter sections into the plane of a suitably stationary tripping device so that at the proper time it will be engaged and, due to the rotation of the cutter section, will cause the rocking lever 97 to oscillate upon its pivot and project the forward end 99 of the rocking lever out beyond the surface of the cutter section carrying with it the advance end of the chip which is to be removed. I prefer to make the tripping device which operates the rocking lever adjustable. Such a construction is illustrated in Figs. 1, 3, 4 and 6. Extending across the machine and secured to the side frames 77 is a cross bar 104 which is slotted at 105 to receive the securing bolt 106 of an L-shaped bracket plate 107. Pivoted in the bracket plate 107 is the trip finger 108 which projects toward the cutter cylinder and has at its end a lug 109, which is adjustably secured by means of bolt 110 and nut 111 so as to project into the path of the post 102 on the rocking lever 97. The trip finger 108 has a looped or perforated intermediate portion 112 (see Fig. 6) through which passes a bolt 113 which is threaded into the bracket plate 107. Between the head of bolt 113 and the trip finger 108, a compression spring 114 is confined so that the trip finger is resiliently held in a lowered position. The pressure of the springs 114 may be adjusted by turning the bolt 113 as is obvious.

Positioned above the cutter cylinder is a pair of chip removal rollers 115 and 116 either or both of which may be driven by a suitable power connection. The function of the rocking lever 97 is not only to free the forward end of the chip from the web, but also to direct it into the bight of the chip removal rollers 115 and 116 so that the completion of the chip freeing operation is effected by the chip removal rollers. With these functions in mind it will be apparent that it is desirable to be able to accurately adjust the actuation of the rocking lever 97, not only so as to properly break out the end of the chip, but for the further purpose of properly directing the forward end of the chip to the chip removal rollers. By the construction illustrated in Fig. 6 the exact timing of the actuation of the rocking lever 97 may be regulated to a nicety so that, as illustrated in Fig. 8, the rocking lever 97 will direct the end of the chip into the removal rollers and be released from its actuating trip finger in time to be withdrawn below the surface of the cutter cylinder before its forward end is carried into interference with the chip removal rollers. By moving the L-shaped bracket plates 107 toward or away from the medial line of the machine, the lever actuating mechanism may be adjusted to different sizes of envelops to correspond with the adjustment of the cutter cylinder sections.

In the operation of the devices just described it sometimes occurs that a chip is imperfectly removed, with the result that the waste accumulates and becomes entangled in some of the moving parts of the apparatus. In such cases the strain encountered by the parts may become so great as to cause a fracture of the support of the chip removal rollers. I therefore prefer to mount them in a resilient frame so that upon the accumulation of waste the rollers may be relieved of such strain by the resilience of their support. An example of such a support is illustrated in Figs. 1, 3, 4, 10 and 11. Referring to these figures it will be seen that at each side of the machine I mount upon the shouldered sleeve 8 an arm 117, which is secured in place by means of segment 118, and further supported by stud 119, which rests in a perforation formed in the upright arms 78, (see Fig. 1). The upper portion of the arms 117 are provided with bearings 120, which received the axle pins 121, on which are mounted the bearing lugs or ears 122, of a U-shaped frame 123. The frame 123 is slotted at either side, as indicated at 124, and through this slot is passed a bolt 125, which is pivoted at 126, in a recessed portion of the arm 117. A washer 127 surrounds the bolt below frame 123, and between this washer and the lock nuts 128, is confined a compression spring 129, which thus resiliently holds the frame in its normal position, the forward end of the frame then resting against an underneath shoulder 130, formed on the arm 117.

I have already stated that chip removal rollers 115 and 116 may either or both be driven by a suitable power connection. Preferably these rollers are so mounted that they may move away from each other upon the accumulation of waste on one or the other. Such a construction is illustrated in connection with resiliently mounted frame 123, just described. At either side of the resiliently mounted frame 123, is a bearing bracket 131, which is slotted at 132, to receive the screw 133, which is threaded into the frame 123, and by which the position of the bearing bracket 131 may be adjusted toward or away from the cutter cylinder above described. The lower chip removal roller 115, is journaled in the bearing bracket 131, and upon its reduced ends are mounted the plates 13 , the upper ends of which, 135, are slotted to provide bearings for the upper chip removal roller 116, which thus rests by gravity against the lower roller 115. The plates 134, are also slotted at 136, on an arc of a circle concentric with the axis of the lower roller 115, so that the plates may be turned upon such axis of oscillation to move the upper chip removal roller toward or away from the cutter cylinder, and be secured in an adjusted position by means of a set bolt 137, which passes into the side of the frame 123. With the construction illustrated it is thus apparent should the waste become entangled upon the chip removal rollers and thus tend to become wedged between the lower roller 115 and the cutter cylinder, which might cause the breakage of some parts of the device, the frame 123 automatically yields and swings upon its axis formed by pins 121, away from the cutter cylinder thus relieving the pressure. At the same time the rollers 115 and 116 are free to move away from each other by reason of the mounting of the upper roller 116 in a slot bearing formed in the plate 134.

From the cutting mechanism and its related parts, just described, the web which has had the chips removed from its edges, but which is still continuous is carried under a guide roller 138, mounted in the bearing 139, secured to the side frames, and delivered to the blank severing mechanism, illustrated in Figs. 1, 15 and 16. This mechanism comprises, in general, upper and lower rollers 140 and 141, mounted in bearing blocks 142 and 143, respectively, which are resiliently positioned in a slotted vertical frame 144, and held in normal position by means of a compression spring 145, which may be adjusted by turning the screw 146, which passes through cap plate 147. The upper roller 140 is provided with a V-shaped knife 148, which coöperates with lower roller 141 to sever the web into blanks on a V-shaped line transversely of the web, thereby forming the sealing flap at one end of the blank and the V-shaped end of the envelop back at the other end of the blank. The blank severing rollers at the same time serve as transverse creasers and carrying mechanism for a subsequent operation. For this purpose the upper roller 140 is provided with transverse creaser blades 149, while the lower roller is provided with oscillating gripper plates 150, which are positioned in slots 151, formed on the face of the lower roller 141. A shaft 152 supports each gripper plate 150 and projecting from the shaft is a spring attachment finger or pin 153, to which is secured a return spring 154, fastened at 155, to the lower roller. An arm 156, also projects from one end of each of the shafts 152, into the plane of stationary cams 157 and 158, whereby during the rotation of the lower roller 141 the shafts 152 are rocked at the moment preceding the entrance of the creaser bars 149, into the respective slots of the lower roller 141, and immediately thereafter released upon the bight of paper, which has been forced into the slots by the creaser bars, in a manner well known to those skilled in this art. The paper as it emerges from the upper and lower rollers 140 and 141 is thus severed into blanks, the advanced V-ends of which must be subjected to an end trimming operation for clipping off the corners. The feed of the projecting free end of the blank is frequently attended with some difficulty when the paper operated upon is especially thin and flexible, or when envelops of the larger sizes are being made. The air resistance to the free and unsupported end of the paper obviously tends to interfere with its proper travel to the end trimmer and consequently the speed at which the machine may be operated would ordinarily be limited by the ability of the paper by its stiffness to thus move against the air resistance into the position which it is to occupy during the moment of clipping off the corners.

My present invention provides an improved guide and auxiliary feed device for assisting the free end of the paper in its movement to the end trimmer. This guide or auxiliary feed device is in the form of a moving part upon which the free end of the paper may rest and with which it may be moved in the direction of the end trimmer. Obviously numerous forms of mechanism whether continuous as belt conveyers, rotary, oscillating or intermittent in their motion might be employed as a moving guide since the assistance required is all in the same direction and the subsequent withdrawal of the sheet is effected positively by the lower roller 141, which does not release the blank from its gripping blade until after the removal of the paper from the end trimmer. The reciprocating form of moving guide which I have shown in the accompanying drawings and shall now describe will serve to illustrate the essential principle involved, but it is to be understood that the invention is not limited to this particular form of mechanism for effecting these purposes.

The end trimmer and its associate parts are all supported by cross bar 159, which has slotted end flanges 160 resting upon the supporting flanges 161 of the arms 162, which project rearwardly from the rear frames 144, above described. A screw 163 passes through slotted end flanges 160 and into the supporting flanges 161 so that the cross bar 159 may be moved toward or away from the upper and lower rollers 140 and 141. Secured in suitable position upon the back of the cross bar 159 is the stationary blade 164 of the cutter, which is made fast by screws 165. Secured upon the bottom of the cross bar 159 is the waste pan or trough 166, which catches the waste as it falls from the cutter. The cross bar 159 has integral with it or secured thereto a pair of journal bearing lugs 167 and 168 in which is mounted a rock shaft 169, (see Figs. 18 and 22). A pair of rock arms 170 and 171 fixed on rock shaft 169 engage by their slotted rear ends the moving cutter blade 172, which is guided by retaining plates 173 and 174, secured upon the back of the supporting cross bar 159 by means of screws or the like 175. Rock shaft 169 has its rocking motion imparted to it by a rock arm 176, which is fixed to it and has pivoted in its upper end a link 177, the bifurcated forward end of which straddles the shaft of roller 142 and has journaled in it an anti-friction roller 178 which operates in a cam groove 179 formed on the face of a disk 180, which is secured to the shaft. The form of the cam groove 179 is such that at the proper moment the anti-friction roller 178 is given a rearward throw, which reciprocates the link 177, thereby rocking the rock shaft 169 and momentarily depressing the movable cutter blade 172. Between the rock arm 170 and guide plate 173 I secure on the cutter blade 172 a pair of plates 181 and 182 and similarly at the other side a pair of plates 183 and 184. At the ends of the cutter bar 172 I secure washers 185 and 186. In this way the moving cutter bar 172 is held accurately in place.

The guide for directing the end of the envelop blank to the end trimmer just described is supported upon a slotted base plate 187 (see Fig. 18) which is suitably secured to a bracket or seat 188, screwed to the front of cross bar 159. The inner or upper end of the slotted plate 187 preferably has integral with it a short post 189 from which projects a finger 190, the post 189 and finger 190 being in the medial line of the machine and thus serving as a stop post for the V-shaped end of the paper when the latter arrives in position to be operated upon by the end trimmer. This upper end of the slotted guide plate is disposed within a horizontal recess which extends longitudinally of the cross bar 159, as illustrated in Fig. 18. The screw 191 may secure the stop post 189 in the cross bar 159, the play of the screw 191 within the cross bar permitting of a slight adjustment of the stop post so that the corners of the paper project over the stationary cutter blade 164, during the cutting operation. The slotted guide plate 187 forms a rest or support, upon which the guide plate 192 is reciprocated. The guide plate 192 is secured to the slotted guide plate 187 by means of a counter sunk screw 192ᵃ, which passes through the slot of plate 187 and carries a washer 192ᵇ, whereby movement of the plate 192 is permitted in the direction of the slot of plate 187. For the purpose of reciprocating the moving guide plate 192 I also secure to it a counter sunk screw 193, which passes through the slot of plate 187 and has surrounding it a washer or spacing disk 193ᵃ, and to which screw is secured a slotted end of a bell crank lever 194 by means of a nut 195. The bell crank lever 194 is pivoted in its bracket 196, which is suitably secured to the cross bar 159 and its forward end is resiliently secured by return spring 197 to the arm 162.

Adjustably secured within slot 198 near the forward end of bell crank lever 194 is an anti-friction roller 199, which is held resiliently against the face of a cam disk 200 secured on a shaft 201, which is suitably mounted in the frame work of the machine. The operation of the cam 200 is thus to oscillate the bell crank lever 194, which thus alternately advances and withdraws the moving guide plate 192, the operation being so timed as to have the moving guide plate 192 to approach the end trimmer simultaneously with the free end of the envelop blank, but at slightly higher speed. It will be observed that the upper end of the moving guide plate 192, has a central recess which permits it to avoid the stop post 189 at the upper portion of its travel. Fingers 202 secured on cross bar 159 operate to deflect the free end of the paper down upon the moving guide plate 192.

It will be understood that the operation of the bottom roller 141 after advancing the free end of the sheet into position for the end trimmer to operate upon it, still retains its grip upon the blank by its transverse creaser bar so that upon the continued rotation of the lower roller 141 it will operate to double the blank on the transverse line near the middle and carry it from the end trimmer past the gummer as has already been explained in my earlier U. S. patent above referred to.

From the lower roller 141 the blank thus folded is delivered to the seam forming mechanism indicated diagrammatically at 203 in Fig. 1 of the drawings, where the edges of the blank are turned over upon the back along the creases formed by the preliminary creaser mechanism. From the seam forming mechanism 203 the complete envelop is discharged on to the delivery wheel 204 in accordance with well known principles of operation.

Figure 25:
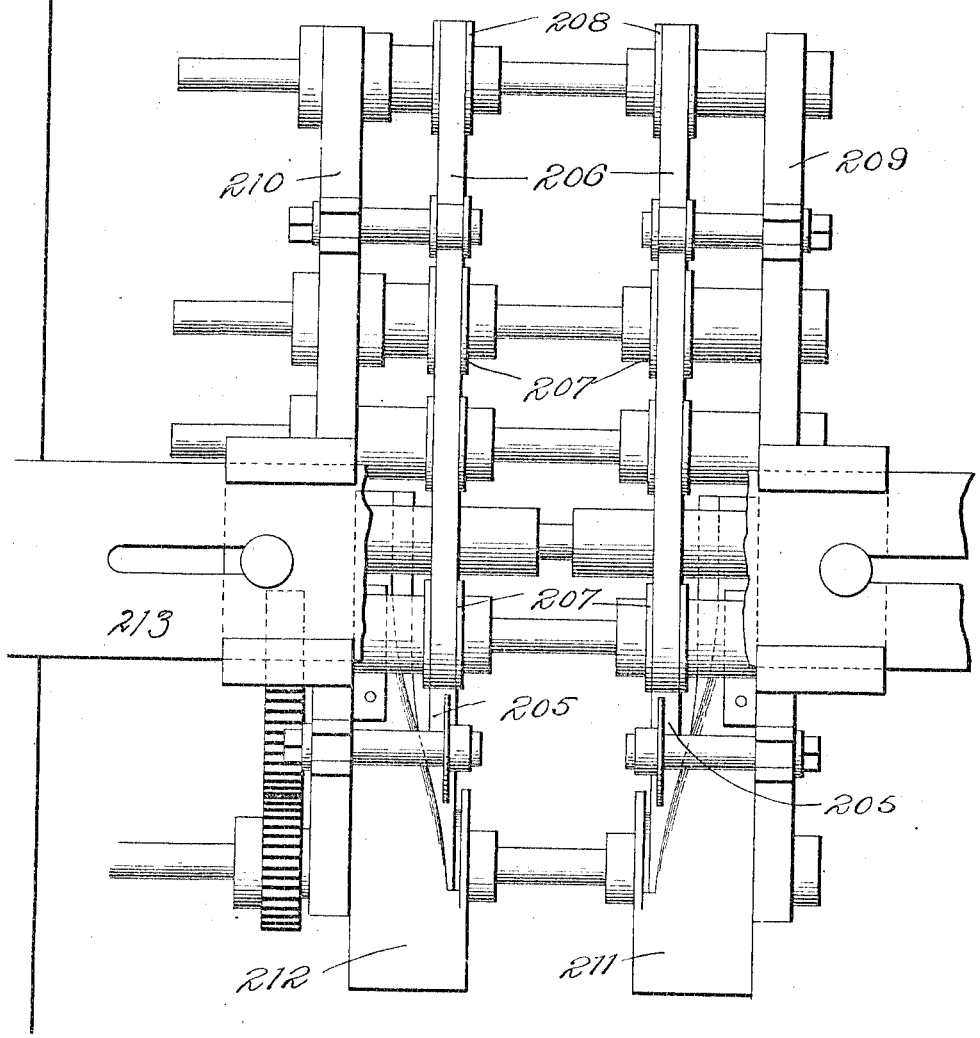

The seam forming mechanism is illustrated in Figs. 24 and 25. This mechanism comprises in general the upper and lower belts 205, 206, respectively, operating upon their respective rollers 207, 208, mounted in suitable adjustable frames 209, 210 and folding plates 211, 212. The frames 209 and 210 are mounted on a cross plate 213. The envelop blank which has been gummed and transversely folded passes into the bight of the two pairs of carrying belts 205, 206, by which it is advanced through the folding plates 211, 212, which turn over the edges on the creased lines to form the side seams. The seams are disposed upon the outside of the envelop back and pressed down by seam pressing rollers 214, and 215, after which they are discharged onto the delivery wheel 204, as above referred to.

What I claim is:

1. In apparatus of the character described, the combination with means for forming a fold along the edge of a continuous web; of plates or fingers for opening the fold thus formed, means for severing the web into blanks, and means for folding over the seams on the creased line formed by the edge creasing device.

2. In apparatus of the character described, the combination with a preliminary edge creasing means, operating upon the continuous web to form a temporary fold, fold opening plates or fingers receiving the continuous web therefrom, and an edge cutting mechanism operating upon the continuous web after the fold is opened; of blank severing and folding mechanism, and means for turning over the edge of the blank on the creased line formed by the preliminary edge creasing means.

3. In apparatus of the character described, the combination with edge turning plates, and a folder bar against which the paper is held during the edge turning operation; of creaser rolls, fold retaining fingers located between the folder bar and creaser rolls, and means for opening the folds thus formed.

T. WILLIAM KIENAST.

Witnesses:
P. AMRHEIN,
N. CLAIR.